United States Patent [19]

Grupp et al.

[11] Patent Number: 5,764,540
[45] Date of Patent: Jun. 9, 1998

[54] COORDINATE MEASURING APPARATUS WHEREIN THE MEASURING TIME IS OPTIMIZED

[75] Inventors: Günter Grupp, Böhmenkirch; Ralf Bernhardt, Aalen; Otto Ruck, Pfahlheim; Berndt Kammleiter, Oberkochen; Wolfgang Wiedmann, Aalen, all of Germany

[73] Assignee: Carl-Zeiss-Stiftung, Heidenheim, Germany

[21] Appl. No.: 790,592

[22] Filed: Jan. 29, 1997

[30] Foreign Application Priority Data

Jul. 24, 1996 [DE] Germany ............... 29612861 U

[51] Int. Cl.$^6$ ............................................ G06F 19/00
[52] U.S. Cl. ................. 364/560; 364/474.37; 364/575
[58] Field of Search ............... 364/474.03, 474.37, 364/560–564, 575, 581, 559; 33/503, 504, 505, 551–555

[56] References Cited

U.S. PATENT DOCUMENTS

| | | | |
|---|---|---|---|
| 4,394,608 | 7/1983 | Tryber et al. | 364/474 |
| 4,542,467 | 9/1985 | McMurtry | 364/474 |
| 4,587,622 | 5/1986 | Herzog | 364/561 |
| 4,636,960 | 1/1987 | McMurtry | 364/474 |
| 4,663,852 | 5/1987 | Guarini | 33/503 |
| 4,719,703 | 1/1988 | Ross et al. | 33/503 |
| 4,916,825 | 4/1990 | Breyer | 33/561 |
| 5,333,386 | 8/1994 | Breyer et al. | 33/503 |

*Primary Examiner*—James P. Trammell
*Attorney, Agent, or Firm*—Walter Ottesen

[57] ABSTRACT

A coordinate measuring apparatus for measuring a workpiece with a probe head having a probe element for contacting the workpiece. The coordinate measuring apparatus includes: a plurality of sensors with each sensor supplying a signal indicative of a coordinate measurement position and a processing unit. An interface device between the plurality of sensors and the processing unit receives the signals and supplies a plurality of output signals to the processing unit representing respective position measurement values at any given instant of time. The processing unit includes at least one smoothing function block for continuously receiving a portion of the position measurement values. The smoothing function block is adapted to determine a final position measurement value ($X_E$, $Y_E$, $Z_E$ or $R_E$) of the contact point of the probe element on the workpiece in a defined standstill of the apparatus by averaging a defined number of the received position measurement values to form a mean value. The processing unit further includes a function block for triggering the averaging before the apparatus reaches standstill and continuing the averaging until standstill is determined.

13 Claims, 3 Drawing Sheets

COORDINATE MEASURING APPARATUS WHEREIN THE MEASURING TIME IS OPTIMIZED

FIELD OF THE INVENTION

The invention relates to a coordinate measuring apparatus including a probe head having a probe element for touch contacting a workpiece to be measured. A processing unit connected to the probe head is provided with a smoothing function. The processing unit determines the final position measurement values of the touch contact point in a defined quiescent or standstill state of the coordinate measuring apparatus by averaging a defined number of position measurement values of the coordinate measuring apparatus.

BACKGROUND OF THE INVENTION

Coordinate measuring apparatus of this kind are known from the state of the art. These apparatus conventionally include a probe head which is attached to a mechanical device moveable in three mutually perpendicular measuring directions. The measuring device for moving the probe head usually includes, inter alia, measuring scales which can be scanned via a read head in order to determine the machine position in all three mutually perpendicular measuring directions. The probe head has a probe element for touch contacting the workpiece to be measured which can likewise be moved in all three mutually perpendicular measuring directions. Sensors are provided in the probe head and detect the directional deflection of the probe head.

The mechanical device for moving the probe head is mostly large and heavy in coordinate measuring apparatus so that a long time is needed after the contact touching of the workpiece to be measured until the coordinate measuring apparatus comes to a quiescent state in which relatively precise final position measuring values can be detected. This is the case especially for long contacting paths. In order to obtain the most precise final position measuring values of the coordinate measuring apparatus for the determination of the position of the contact point, after contacting the workpiece, one would wait in known coordinate measuring apparatus until the final position measurement values are detected. This wait would continue until the coordinate measuring apparatus comes to standstill. Here, it should be noted that the position measurement values would change only slightly in a fixed time interval. This quiescent or standstill state was determined in known coordinate measuring apparatus in that a check was made for the machine position as to whether the deviation of the machine position differs in a fixed time interval from a fixed threshold value. After this time point, the coordinate measuring apparatus is always still in movement. For this reason, the final position measurement values would be determined in that averaging would be performed over a fixed defined number of subsequent position measured values.

The special situation for known coordinate measuring apparatus is seen in that often a longer time interval lies between the actual touch contacting of the workpiece and the determination of the final position measurement values. This time interval considerably extends the times for measuring a workpiece. Furthermore, the known system is relatively disturbance prone because fluctuations would act upon the coordinate measuring apparatus after the standstill state thereof has been determined and during averaging and this could considerably falsify the measuring result.

SUMMARY OF THE INVENTION

In view of the above, it is an object of the invention to provide a coordinate measuring apparatus which is relatively insensitive to external fluctuations and wherein the final position measurement values of the contact point can be determined relatively rapidly after contact touching of the workpiece to be measured.

The coordinate measuring apparatus of the invention is for measuring a workpiece. The apparatus includes a probe head having a probe element for contacting the workpiece. The coordinate measuring apparatus further includes: a plurality of sensors with each sensor supplying a signal indicative of a coordinate measurement position; a processing unit; an interface device between the plurality of sensors and the processing unit for receiving the signals and for supplying a plurality of output signals to the processing unit representing respective position measurement values at any given instant of time; the processing unit including at least one smoothing function block for continuously receiving a portion of the position measurement values; the smoothing function block being adapted to determine a final position measurement value ($X_E$, $Y_E$, $Z_E$ or $R_E$) of the contact point of the probe element on the workpiece in a defined standstill of the apparatus by averaging a defined number of the received position measurement values to form a mean value; and, the processing unit further including a function block for triggering the averaging before the apparatus reaches standstill and continuing the averaging until standstill is determined.

The basic idea of the invention is that the mean value formation is triggered already before reaching the standstill state and is continued until the standstill state is determined.

In this way, several advantages are obtained. Thus, the averaged final position measurement values are already present when the standstill state is determined. This ensures that the measuring result is substantially free of disturbing influences because, for the measuring result, it has already been verified that this measuring result has been accepted in the standstill state. Furthermore, and directly after determining the standstill state, the final position measurement values can be accepted so that a mean value computation is not required once again. Furthermore, the averaged position measurement values are used in order to determine the standstill state. The curve of the position measurement values is greatly smoothed via the averaging. For this reason, the standstill state can hereby be more rapidly reached so that a considerable saving in time results therefrom.

The triggering of the mean value formation can take place in various ways. For example, the averaging can be triggered when contact touching the workpiece. The time point of contact touching can then be determined in a simple manner in that the probe head deflection is monitored. The triggering results as soon as the probe head deflection exceeds a pregiven value in at least one direction. The averaging can, however, already be triggered in advance of the contacting operation during the approach to the workpiece via the control of the coordinate measuring apparatus.

Basically, all measurement values can be considered as possible position measuring values which are determined during the measurement of the workpiece. Thus, individual measured values or all measured values can be used which indicate the machine position in the three mutually perpendicular measuring directions. Also, angle measurement values of a rotatable round table can be used on which the workpiece is mounted.

The position measurement values can likewise be composite values. Thus, a position measurement value can be formed in an adder by addition of the machine position in at least one of the measuring directions and the direction corresponding to the probe head deflection.

The position measurement value occurring hereby has the special advantage that it fluctuates only slightly because the probe head deflection is essentially opposite to the movement of the machine. Accordingly, the final position measurement value of the contact point can be determined very rapidly via the smoothing of the occurring position measurement values via averaging. Furthermore, the contact speed with which the probe element is moved toward the workpiece to be measured can be increased because the common monitoring of the machine position and of the probe head deflection ensures that the probe head actually exhibits the standstill condition necessary for assuming the final position measurement values. This is not possible by exclusively monitoring the machine position, except if scanning is performed with an experimentally tested low contact speed because the probe head can still vibrate when the contact speed is too high even though the measured machine position no longer changes. As a consequence thereof, difficult adjusting operations are also not needed which are necessary in conventional apparatus in order to determine the optimal contact speeds of the probe head for contact paths of different length.

The averaging of the position measurement values can likewise be configured in various ways. Accordingly, the averaging can take place via an arithmetic mean value formation. The averaging can, however, also take place via a weighted averaging value formation wherein the most recent position measurement values are weighted more than the older position measurement values.

The coordinate measuring apparatus is especially advantageously configured when the determined mean values are at least partially stored in the form of mean value series. One or several of the these mean values can be used as final position measurement values of the contact point. A check is made for these mean values to determine if the standstill state has occurred.

To determine standstill, the processing unit further includes a check function which determines standstill and by means of which a check can be made for at least one series of values as to whether the deviation (in magnitude) of the values drops below a fixed threshold in a fixed time interval. The time point of standstill, at which the position measurement values should be read out from the mean value series to determine the position of the contact point, can be derived from the time interval in which the checked values drop below the threshold value.

The values, which are checked via the check function, can vary. Advantageously, some or all of the mean value series, which are generated by the smoothing function, can be checked by the check function. The values to be checked can also be test values which are derived from the mean values. For example, a test value series can be determined from the mean value series and a vector perpendicular to the plane of the workpiece. This test value series can represent a measure for the movement perpendicular to the plane scanned by the probe element. In this way, and for checking standstill, only the components of the mean value series which are perpendicular to the contact plane are considered; whereas, components parallel to the contact plane are not considered. In this way, the special advantage results that the time from contacting the workpiece up to assumption of the final position measurement values can be shortened and especially when vibrations occur parallel to the contact plane. In an especially simple solution, as in conventional coordinate measuring apparatus, the unchanged position measurement values can be checked directly as check values.

The threshold values for checking the mean value series can either be equal for all mean value series or can be individually different.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
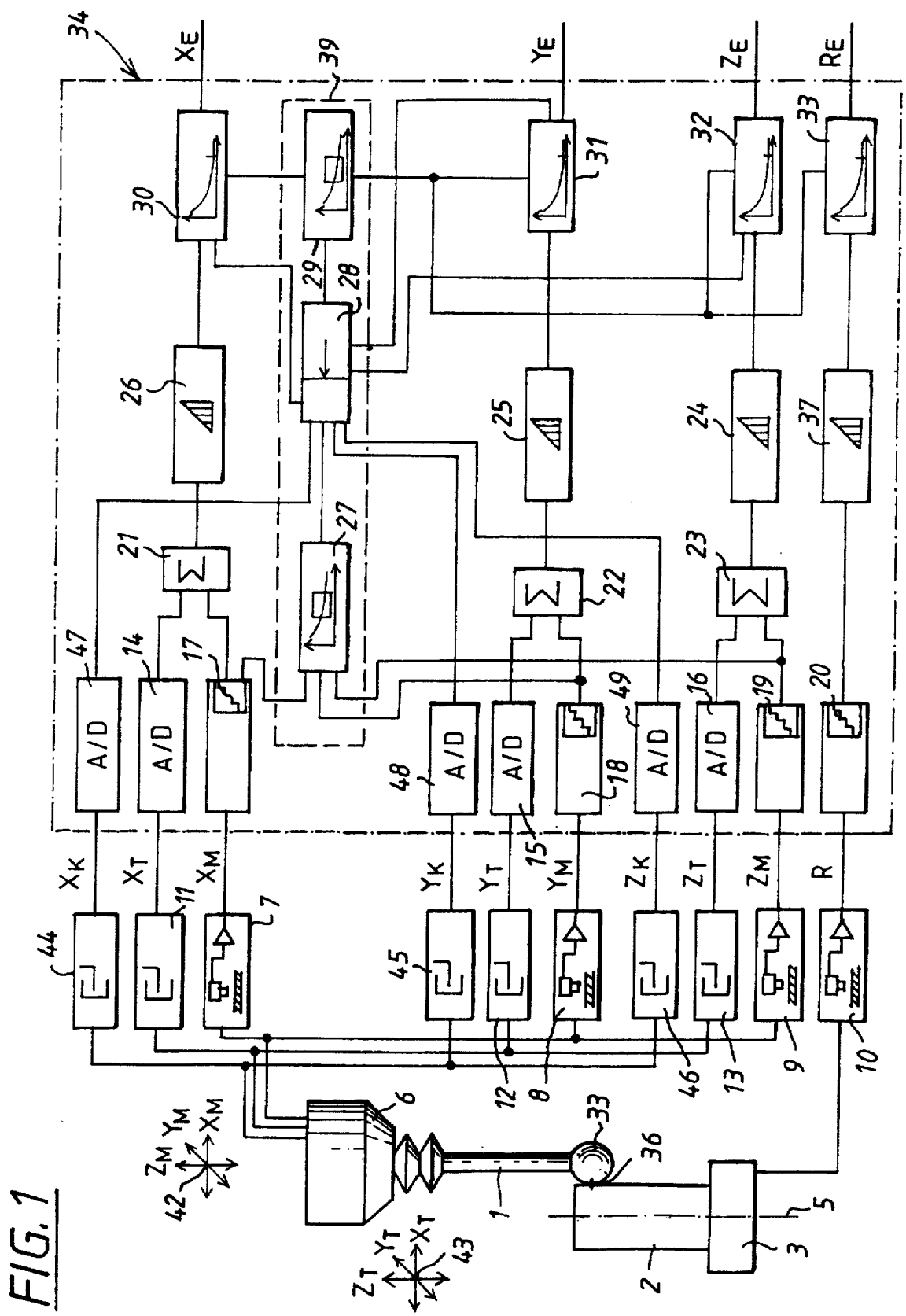
FIG. 1 is a schematic block circuit diagram showing the essential components of the coordinate measuring apparatus of the invention.

FIG. 1 is a simplified schematic block circuit diagram of a coordinate measuring apparatus of the invention which includes a probe head 6 having a probe element 1 for touch contacting the workpiece 2 to be measured. The probe head here is a so-called measuring probe head. The probe head can be moved via the mechanical device in accordance with arrows 42 in three mutually perpendicular measuring directions. Coordinate measuring apparatus of this kind are produced by Carl Zeiss, Germany, and are sold under the product designation UPMC (universal precision measurement center). Length measuring systems (7, 8, 9) are provided on the mechanical device for moving the probe head 6. These length measuring systems are shown here only schematically. Length measuring systems of this kind conventionally include a so-called incremental measuring scale on which an incremental scale division is provided and a sensor moveable relative to the scale. The sensor detects the increments. The length measuring systems (7, 8, 9) detect the machine positions ($X_M$, $Y_M$, $Z_M$) of the probe head in the X, Y and Z directions. These measuring positions are detected in the appropriate sequence.

In addition, the probe element 1 is moveable relative to the probe head 6 in three mutually perpendicular directions in accordance with arrows 43. The corresponding probe head deflection ($X_T$, $Y_T$, $Z_T$) is detected via the sensors (11, 12, 13) which are usually in the probe head 6. However, for the sake of clarity, the sensors are shown schematically outside of the probe head 6. The sensors (11, 12, 13) detect the probe head deflection in the X, Y and Z directions in the corresponding sequence. The corresponding measurement directions of these sensors (11, 12, 13) are aligned parallel to the measuring directions of the length-measuring systems (7, 8, 9). In addition, force measuring generators (44, 45, 46) are provided in the probe head via which the contact-touching force of the probe element on the workpiece 2 can be adjusted and the actual measuring force ($X_K$, $Y_K$, $Z_K$) can be determined in the corresponding sequence in the X, Y and Z directions. Such sensors and measuring force generators are likewise adequately known from the state of the art and are also incorporated in the coordinate measuring apparatus (UPMC) referred to above.

In addition, a rotatable round table 3 is provided on which the workpiece 2 to be measured is mounted. The rotatable round table 3 can be rotated about the axis 5 so that the workpiece 2 is rotated therewith. The round table 3 includes an angular measuring system 10 with which an angular measuring value can be determined which indicates the rotational angle of the round table. The angle measuring system 10 operates in a manner similar to the length-measuring systems (7, 8, 9) and is likewise known from the state of the art and is incorporated, for example, in the above-mentioned coordinate measuring apparatus (UPMC).

In the following, the processing unit 34 of the coordinate measuring apparatus of the invention will be described. With this unit, the final position measurement values of the contact point 36 are determined. The processing unit 34 can comprise a single component or can be made up of discrete components. Furthermore, the functions are realized with programs in one or more microprocessors or the functions can be hardwired.

The main elements of the processing unit 34 are the smoothing functions (24, 25, 26, 37). These smoothing functions determine the final position measurement values $(X_E, Y_E, Z_E, R_E)$ of the contact point 36 by averaging over a defined number of position measurement values of the coordinate measuring apparatus. The processing unit 34 is so configured that after a probe head deflection, which exceeds a predetermined value in at least one direction, is detected by one of the sensors (11, 12, 13) via a device (not shown), the averaging is triggered and is continuously advanced. The smoothing functions (24, 25, 26, 37) then assume, according to the invention, the task of carrying out an averaging for individual position measurement values of the coordinate measuring apparatus. The smoothing function 26 averages over the position measurement values in the X direction present at its input and the smoothing function 25 averages position values in the Y direction which are present at the input thereof and the smoothing function 24 averages the position measurement values in the Z direction present at its input. The smoothing function 37 averages the position measurement values in the form of angle measurement values of the rotatable table 3 present at its input.

Averaging takes place in each case via a fixed defined number of position measurement values which number is usually selected to be approximately 30. For simplicity, the number is here limited to 4. The smoothing takes place as follows. After a contact with the workpiece 2 has been determined via the deflection of the sensors (11, 12, 13), each of the smoothing functions begins to read in four position measurement values and forms a mean value over these measurement values. The mean value formation can either be an arithmetic mean value formation wherein the four measurement values are summed and divided by the number of summed measurement values or the mean value formation can be a weighted mean value formation wherein the more recent position measurement values are a weighted greater than the older position measurement values. A weighting of this kind can, for example, take place via a factor and can be configured as:

$$M = \frac{\Sigma(F_i M_i)}{\Sigma(F_i)} \quad i = 1 \ldots 4$$

wherein: $\overline{M}$ defines the mean value to be computed, $M_i$ embodies the position measurement values and $F_i$ defines the corresponding weighting factors. In order to obtain a greater weighting of the more recent position measurement values, the following must therefore apply, namely, $F_{i+1}$ must be equal to or greater than $F_i$. A so-called triangular weighting is especially advantageous wherein the factors $F_i$ increase uniformly by a constant amount. With the described greater weighting of the more recent measurement values, the condition can be reached that the older measured values (for which the system is still in greater movement) are considered to a lesser extent during the mean value formation while the more recent measurement values, for which the system is already closer to standstill and which measurement values therefore lie significantly closer to the final end position, are given greater consideration.

The averaging advances continuously in that for each new incoming position measurement value, a new averaging takes place. The oldest position measurement value of the previous averaging no longer is included in the new averaging because the averaging takes place over a defined number of position measurement values.

The mean values, which are generated via the smoothing functions (24, 25, 26, 37), are each stored in the memories (30, 31, 32, 33) in the form of a mean value sequence with these memories being assigned to corresponding ones of the smoothing functions. In this way, the corresponding mean value can be read out from the above-mentioned mean value sequence directly at a time point $t_e$ at which standstill is reached. The corresponding mean value then represents the final position measurement value $(X_E, Y_E, X_Z, R_E)$.

The position measurement values, which go into the smoothing functions (24, 25, 26, 37) can vary. The case of the smoothing function 37 is concerned simply with the digitized angle measurement value R of the round table 3. For this purpose, the signals, which are supplied by the angle measuring system 10, are converted into a digitized angle measuring signal via an evaluator 20 arranged in the processing unit 34.

The smoothing functions (24, 25, 26) are concerned with somewhat more complex position measurement values wherein the position measurement values can be determined by summing of the machine position in each of the three mutually perpendicular coordinate measuring directions and the direction corresponding to the probe head deflection via corresponding summation units (21, 22, 23). Before adding the machine positions $(X_M, Y_M, Z_M)$ and the probe head deflections $(X_T, Y_T, Z_T)$ via summing units (21, 22, 23), the corresponding measurement values must likewise be digitized which, in the case of a probe deflection $(X_T, Y_T, Z_T)$ takes place via the analog/digital converters (14, 15, 16) and, in the case of machine positions $(X_M, Y_M, Z_M)$, via the evaluators (17, 18, 19).

The machine position and the probe head deflection are added so that these can supplement each other in direction and so that therefore the addition signal resulting therefrom after contacting the workpiece 2 exhibits only a very slight amplitude. If the machine position of the probe head 6 changes toward the workpiece 2, then in the same amount, the probe element 1 is deflected in the opposite direction relative to the probe head 6. If the machine position and the probe head deflection are added, then both movements mutually compensate in the ideal case.

In addition, the processing unit 34 also has a check function 39 which precisely determines when standstill is reached and which determines which of the mean values should be read out as final position value $(X_E, Y_E, Z_E, R_E)$ from the memories (30, 31, 32, 33), respectively. For this purpose, the check function 39 derives from the mean value sequences, which are stored in the memories (30, 31, 32) and a vector (that is, a normal vector, which is perpendicular to the scanned plane of the workpiece), a test value sequence and checks whether the deviation of the test values drops below a fixed threshold value in a fixed time interval. If this is the case, then standstill is present and the corresponding mean values are read out from the mean value sequences in the memories (30, 31, 32, 33) as final position measurement values ($X_E$, $Y_E$, $Z_E$, $R_E$).

The check function 39 operates in accordance with the principle explained below.

The test value function 29 determines the test value series for conducting the check from the mean value series of the memories (30, 31, 32) in that a value series is determined from the mean value series of the memories (30, 31, 32) and a perpendicular to the contacted plane of the workpiece 2. This value series represents a measure for the movement perpendicular to the plane contacted by the probe element 1 at contact point 36. The determination of the measurement values takes place via simple vector arithmetic. Accordingly, in a first step, a vector is set up between each two mutually adjacent mean values at time points $t_i$ and $t_{i+1}$ for each of the three measuring directions and for each of the three coordinate directions. The end of the vector is the measurement value at time point $t_i$ and the tip of the vector is the measurement value at time point $t_{i+1}$. From the three vectors, a resultant vector is formed by vector addition. In a next step, this resultant vector is projected onto the vector perpendicular to the contacted plane of the workpiece 2 so that the component (standing perpendicularly on the contact plane) of the resultant vector is obtained. The magnitude and therefore the length of the component standing perpendicularly on the contact plane is the test value to be checked by the check device. This test value is stored in the test value function 29.

The vector, which is necessary to check the computation of the test value, is, in turn, determined by the perpendicular determination function 28. This vector stands perpendicularly to the contacted plane of the workpiece 2. The perpendicular determination function 28 is connected to the A/D converters (47, 48, 49) and computes vectors from the digitized measured forces ($X_R$, $Y_R$, $Z_R$) in a manner similar to the test value function 29 in that, as tip of the vector the measured value at time point $t_{i+1}$ is used and, as the foot end of the vector, the measured value at time point $t_i$ is used, and this for all three coordinate measurement directions. The A/D converters (47, 48, 49) each digitize the measuring forces ($X_R$, $Y_R$, $Z_R$) of the measuring force generators (44, 45, 46). The vector (which is perpendicular to the contacted plane of the workpiece 2) is then formed by simple vector addition of the three computed vectors.

The final determination of the vector, which stands perpendicular to the contacted plane of the workpiece 2, can only take place after the movement of the coordinate measurement apparatus has been reduced to a certain minimum scale because only at this time point can reasonable data be obtained as to the perpendicular direction, that is, the normal vector. For this reason, the perpendicular check function 27 is additionally provided in the check unit 39. The perpendicular check function 27 checks, in at least one of the measuring directions, as to whether the perpendicular to the contacted plane is stable and, only after this condition is satisfied, permits the determination by the perpendicular determination function 28. For this purpose, the change in magnitude of the measured values of the machine positions ($X_M$, $Y_M$, $Z_M$) per defined time interval is monitored and a corresponding signal is outputted to the perpendicular determination function 28 when the change of the probe head position drops below a defined threshold value. Only in response to this signal, can the perpendicular determination function 28 compute the vector which stands perpendicularly to the contacted plane of the workpiece 2. The perpendicular check function 27 is directly connected to the outputs of the evaluators (17, 18, 19) for monitoring the probe head position.

Probe heads are known from the state of the art wherein the measurement force is generated via springs in lieu of via measurement force generators. The measurement forces are determined from the probe head deflection. In this case, the perpendicular determination function 28 must determine the normal vector from the probe head deflection ($X_T$, $Y_T$, $Z_T$) and be connected to the outputs of the A/D converters (14, 15, 16).

In FIGS. 2a to 2e, the signal trace is shown in the evaluation unit 34 for the contact example shown in FIG. 1 in order to explain the operation of the coordinate measuring apparatus. In this example, the plane of the workpiece 2 to be contacted is parallel to the Y-Z plane so that the probe pin 1 is deflected only in the X direction.

Figure 2A:
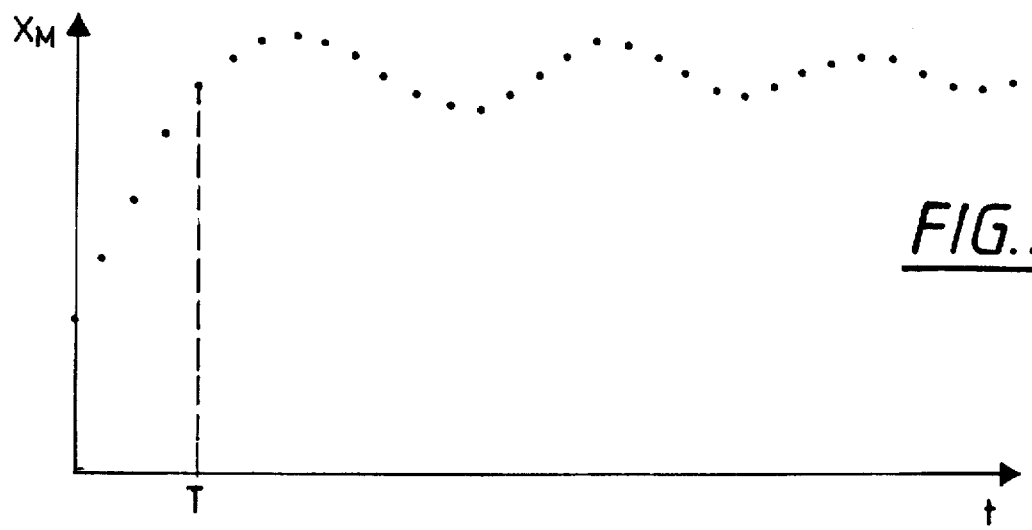
FIG. 2a shows the time-dependent trace of a first signal ($X_M$) which represents the machine position in the X direction.

In FIG. 2a, the digitized machine position is shown in the X direction ($X_M$) which is transmitted by the displacement evaluator 17 to the summing unit 21. At time point T, the contact of the ball 33 on the workpiece 2 takes place. As shown in the further trace of the measurement signal, the measurement curve slowly oscillates about a final measurement value.

Figure 2B:
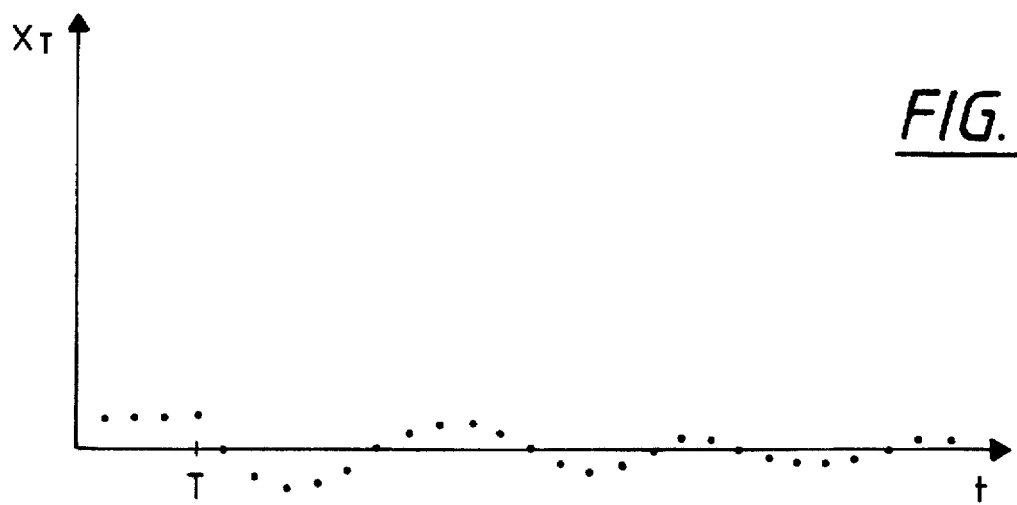
FIG. 2b shows a signal ($X_T$) of the probe head deflection in the X direction as a function of time.

FIG. 2b shows the probe head deflection $X_T$ which is digitized by the A/D converter 14. This shows that the signal is constant up to time point T. Only after contact, does the position of the probe element 1 change in the X direction and therefore the probe deflection. Here too, the curve slowly oscillates as shown.

Figure 2C:
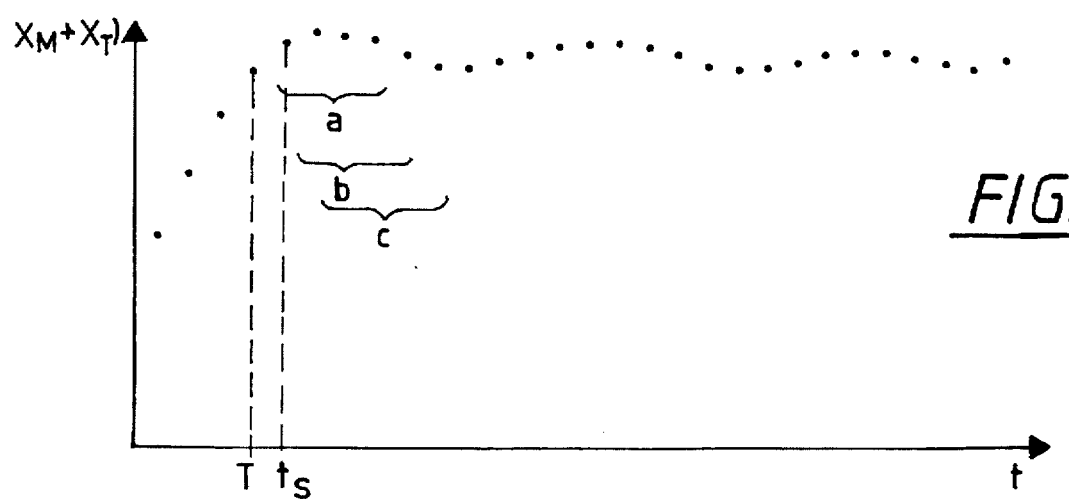
FIG. 2c shows a signal ($X_M+X_T$) which represents the sum of the signals of FIGS. 2a and 2b.

FIG. 2c shows the corresponding signal downstream of the summing unit 21 after the signals from FIGS. 2a and 2b are added by the summing unit 21 to form the position measurement value ($X_T$+$X_R$).

Figure 2D:
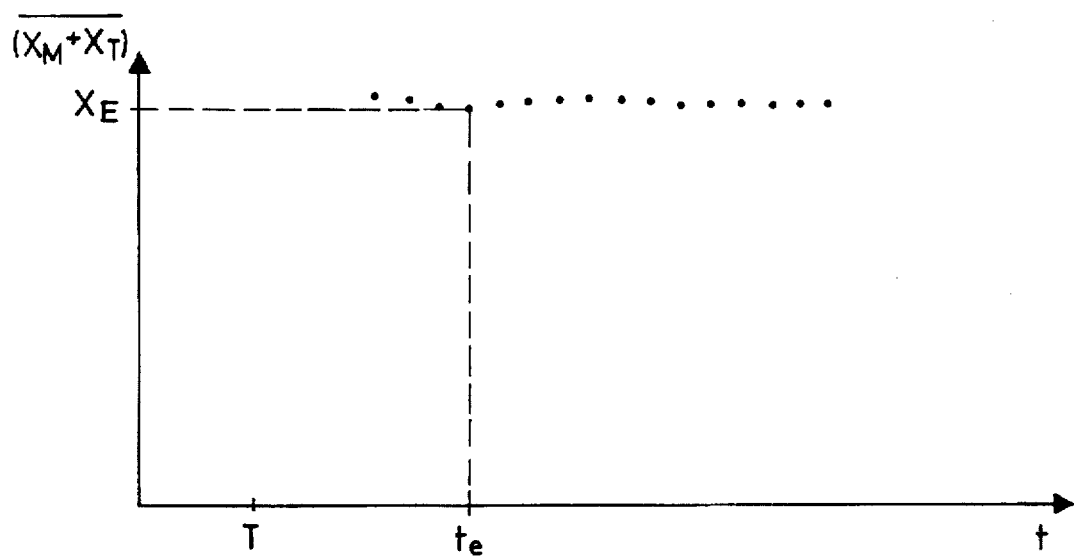
FIG. 2d is the signal of FIG. 2c after being smoothed by averaging.

FIG. 2d shows the mean value series $\overline{(X_M+X_T)}$ formed by the smoothing function 26. The mean value series $\overline{(X_M+X_T)}$ is stored in the memory 30. As described above, an average (a) is taken over the first four position measurement values shown in FIG. 2c to determine the first position measurement value. The averaging is triggered by the deflection of the sensor 11 at time point $t_r$. The second position measurement value of FIG. 2d is provided in precisely the same manner as the first position measurement value by averaging (b) over four measurement points in accordance with FIG. 2c. Here, a new measurement value is introduced into the averaging so that the first measurement value of the preceding averaging (a) in accordance with FIG. 2c does not go into the averaging and this is shown by the brackets (a), (b) and (c) in FIG. 2c.

Figure 2E:
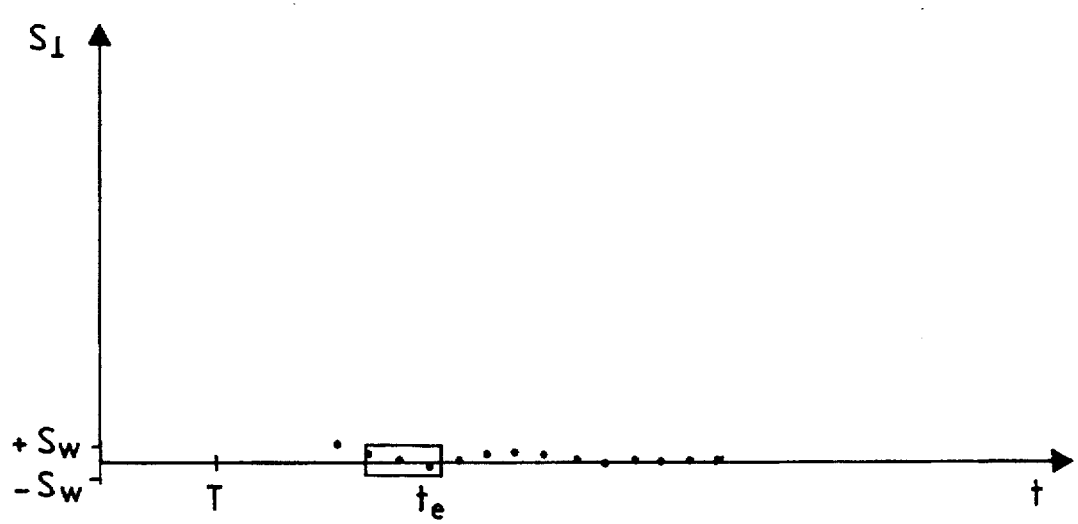
FIG. 2e is a time-dependent trace of signal ($S_\perp$) which is perpendicular to the contact path and which is, inter alia, computed from the measurement values of FIG. 2d.

FIG. 2e shows the test values as they are computed by the test value function 29 of the check function 39 and are stored for checking. As mentioned above, for forming the measurement values in the test value function 29 from the stored mean value series of the memories (30, 31, 32), a test value series is determined having test values which represent a measure for the movement perpendicularly toward the plane contacted by the probe element. The plane of the workpiece to be contacted in this embodiment is parallel to the X-Z plane. For this reason, the perpendicular direction on the plane to be contacted is in the X direction.

The value S⊥ shown in FIG. 2e therefore represents the perpendicular movement of the system in the X direction. This movement is computed in accordance with the algorithm described above. With the check of the test value S.L, in a time interval of three measuring points, an observation is made in a measurement window as to whether the magnitude of the test value S.L drops below a threshold value ($+S_w$, $-S_w$). For the case that the three measurement values drop below the threshold value ($+S_w$, $-S_w$), one of the time points is evaluated as a decisive time point at which the coordinate measuring apparatus is at standstill with this time point preferably being the last time point $t_e$ of the window. At this time point, the final position measurement values ($X_E$, $Y_E$, $Z_E$, $R_E$) can be read out from the mean value series of the memories (30, 31, 32). The precision of the measurement result can be varied by changing the measurement window. The precision is, for example, increased when the threshold value ($+S_w$, $-S_w$) is reduced.

As shown in FIG. 2d and as evident from FIG. 2e, the position measurement values are greatly smoothed by the smoothing function 26 to such an extent that, after a few measurement points, the final position measurement value of the probe point can be read out even though the coordinate measuring apparatus itself is still moving significantly (see position measurement values of FIGS. 2a and 2b). Furthermore, the averaged values are already available when standstill is determined by the check function 39 so that after this time point $t_e$, the final position measurement values ($X_E$, $Y_E$, $Z_E$, $R_E$) can be directly taken. Furthermore, this assures that the final position measurement values of the contact point 36 are not made erroneous by a subsequently occurring disturbance fluctuation.

At this point, it is noted that the values, which are shown in FIGS. 2d and 2e, are shown far beyond the defined standstill in order to show the further time-dependent trace of the signals. Usually, the mean value formation and test value formation is ended as soon as the final position measurement values ($X_E$, $Y_E$, $Z_E$, $R_E$) are read out of the memories (30, 31, 32, 33).

The especially advantageous coordinate measuring apparatus shown here is not limited to the embodiment described. The processing unit can, for example, be greatly simplified in that the check function 39 does not check the movement direction perpendicular to the contact plane but instead, checks the mean value series stored in the memories (30, 31, 32). The check function 39 would, for this case and analog to the coordinate measuring apparatus of FIG. 1, check for one, several or all mean value series as to whether the deviation of the mean values drops below a fixed threshold value in a fixed time interval.

The time point $t_e$ is derived from the time interval in which the checked mean values drop below the threshold value. The time point $t_e$ at which the measurement value should be read out of the mean value series for the final determination of the position of the contact point. In addition or alternative to the check function described above, a check function for monitoring the stored mean value series of the rotatable round table 3 can be provided in memory 33. Memory 33 operates in the same manner as the above-mentioned check function. Furthermore, individual position measurement values can be checked via the above-mentioned check function.

It is understood that the foregoing description is that of the preferred embodiments of the invention and that various changes and modifications may be made thereto without departing from the spirit and scope of the invention as defined in the appended claims.

What is claimed is:

1. A coordinate measuring apparatus for measuring a workpiece with a probe head having a probe element for contacting the workpiece, the coordinate measuring apparatus comprising:

a plurality of sensors with each sensor supplying a signal indicative of a coordinate measurement position;

a processing unit;

an interface device between said plurality of sensors and said processing unit for receiving said signals and for supplying a plurality of output signals to said processing unit representing respective position measurement values at any given instant of time;

said processing unit including at least one smoothing function block for continuously receiving a portion of said position measurement values;

said smoothing function block being adapted to determine a final position measurement value ($X_E$, $Y_E$, $Z_E$ or $R_E$) of the contact point of said probe element on said workpiece in a defined standstill of said apparatus by averaging a defined number of the received position measurement values to form a mean value; and, said processing unit further including a function block for triggering said averaging before said apparatus reaches said standstill and continuing said averaging until said standstill is determined.

2. The coordinate measuring apparatus of claim 1, wherein at least one series of mean values is formed of said position measurement values; and, said processing unit further includes at least one memory for storing at least a portion of the series of mean values.

3. The coordinate measuring apparatus of claim 2, said processing unit further including a check function block for determining said standstill by checking at least one series of mean values as to whether the magnitude of deviation of said mean values drops below a predetermined threshold value ($+S_w$, $-S_w$) in a predetermined time interval.

4. The coordinate measuring apparatus of claim 1, wherein said position measurement values are derived from the signal of at least one of said sensors for measuring the position ($X_M$, $Y_M$ or $Z_M$) of said probe head in one direction.

5. The coordinate measuring apparatus of claim 1, wherein said interface device includes at least one summing device with said summing device being connected to one of said sensors for measuring the position ($X_M$, $Y_M$ or $Z_M$) of said probe head in one coordinate measuring direction and another one of said sensors for measuring the corresponding probe element deflection ($X_T$, $Y_T$ or $Z_T$) in said coordinate measuring direction and adding the corresponding signals of said sensors for defining said position measurement values.

6. The coordinate measuring apparatus of claim 3, said check function block including a check value function adapted to form a test value series for checking by determining a value series from the mean value series and a vector perpendicular to the contacted plane of the workpiece, said value series representing a measure for the movement perpendicular to the plane contacted by the probe element.

7. The coordinate measuring apparatus of claim 6, said check function block including a perpendicular determination function which determines the vector, which is perpendicular to the contacted plane of the workpiece, from the measurement forces ($X_K$, $Y_K$, $Z_K$) of the probe element on said workpiece.

8. The coordinate measuring apparatus of claim 7, said check function block including a perpendicular check function for checking whether the perpendicular to the contacted plane is stable and, only when this condition is satisfied, permitting the determination of the vector, which is perpendicular to the contacted plane of the workpiece, by said perpendicular determination function.

9. The coordinate measuring apparatus of claim 1, further comprising a rotatable round table for accommodating said workpiece thereon; and, one of said sensors being an angle measuring device for supplying a plurality of position measurement values indicative of the angular position of said round table.

10. The coordinate measuring apparatus of claim 1, wherein said averaging is performed as an arithmetic mean value formation.

11. The coordinate measuring apparatus of claim 1, wherein said averaging is performed as a weighted mean value formation for which recent position measurement values are given greater consideration than older position measurement values.

12. The coordinate measuring apparatus of claim 11, wherein said weighting is a triangular weighting.

13. The coordinate measuring apparatus of claim 1, wherein averaging is triggered as soon as the deflection of said probe element exceeds a predetermined value in at least one direction.

* * * * *